Nov. 22, 1932.  E. A. JOHNSTON ET AL  1,888,507
HARVESTER THRESHER
Filed Feb. 9, 1931   2 Sheets-Sheet 1

Inventors.
Edward A. Johnston
and Melville J. Mitchell
By H. P. Doolittle
Atty.

Nov. 22, 1932.  E. A. JOHNSTON ET AL  1,888,507

HARVESTER THRESHER

Filed Feb. 9, 1931  2 Sheets-Sheet 2

Inventors.
Edward A. Johnston.
Melville J. Mitchell
By N. P. Doolittle
Atty.

Patented Nov. 22, 1932

1,888,507

UNITED STATES PATENT OFFICE

EDWARD A. JOHNSTON AND MELVILLE J. MITCHELL, OF CHICAGO, ILLINOIS, ASSIGNORS TO INTERNATIONAL HARVESTER COMPANY, A CORPORATION OF NEW JERSEY

HARVESTER THRESHER

Application filed February 9, 1931. Serial No. 514,423.

The invention relates to a harvester thresher.

These machines as now used employ a harvester part including a reel, which always is held in a fixed position relative to the harvester part. It is found desirable to make such reel adjustable, so that the same may be set in various up and down positions for long and short grain to be cut.

More particularly, therefore, this invention relates to an improved adjustable reel structure for use in connection with harvester threshers.

In some harvester threshers, as in the so-called hill side types, considerable relative movement takes place between the thresher part and the harvester part. In floating platform types of harvester threshers, the harvester part also changes its angular position vertically with respect to the thresher part. Accordingly, if the reel is to be adjustable, the location of the lever for making the adjustment becomes a problem, because it obviously is desirable that this lever should not change its relative position with respect to the operator's station.

Accordingly, it is the primary object of this invention to provide an improved, adjustable reel structure for use in harvester threshers.

Another object is to provide improved adjusting mechanism for controlling the up and down movement of the reel, said mechanism to include a control lever, which at all times has a fixed position with respect to the operator's station on the harvester thresher.

Other objects of the invention will become apparent as the disclosure is more fully made.

These desirable objects may be achieved by the illustrative form of the invention herein disclosed by way of example.

In the drawings,—

Figure 1:
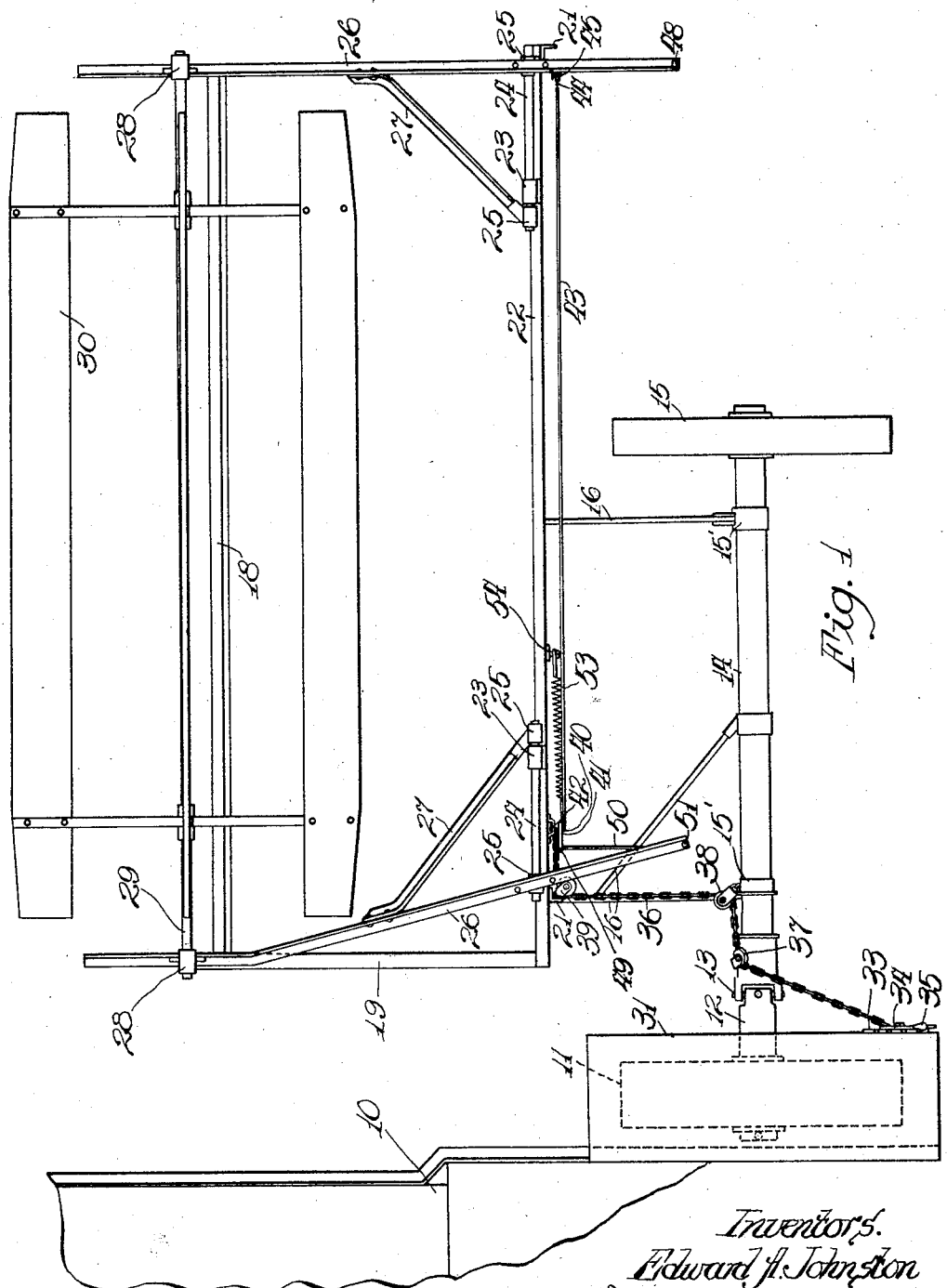
Figure 1 is a plan view of a harvester thresher with the thresher part thereof partly cut away.

The harvester thresher shown in the drawings comprises a main, longitudinally disposed, thresher part 10 carried on a pair of wheels 11 in the usual way, only one of said wheels being shown. The axle 12 of the machine extends grainwardly of the wheel 11 and has connected thereto by a horizontal hinge 13, a transversely and grainwardly extending harvester supporting axle 14, which has its outer end carried in a grain wheel 15.

In any conventional manner the axle 14 carries sleeves 15 which support the usual line levers 16, said line levers 16 extending longitudinally ahead and carrying in the usual manner a transverse angle bar 17 and a transverse front Z-bar 18. At the inner and outer ends of the bars 17 and 18 are frame pieces 19 and 20. The frame pieces and bars numbered 17, 18, 19 and 20 delineate the rectangular framework comprising the usual header platform, which in the conventional manner is offset relative to the longitudinal thresher part.

The angle bar 17 has connected to it at each end a pair of vertical standards 21, across the top of which is arranged a transverse angle bar 22. This angle bar carries at each end a sleeved bracket 23 in which is carried a shaft 24. At the ends of each shaft 24 are arranged rocking sleeve members 25, the outer one of each of said sleeves 25 carrying for rocking movement with said sleeves 25 longitudinally extending beams 26. Each beam 26 is braced to the inner rockable sleeve 25 by diagonal brace members 27. The forward ends of the beams 26 carry bearings 28 for mounting a transverse reel shaft 29 carrying a standard type of reel 30.

It is desired to adjust said reel and set the same in adjusted positions up or down relative to the Z-bar 18 which carries the cutting mechanism (not shown) in accordance with long or short grain being encountered by the machine in its travel through the field.

Figure 2:
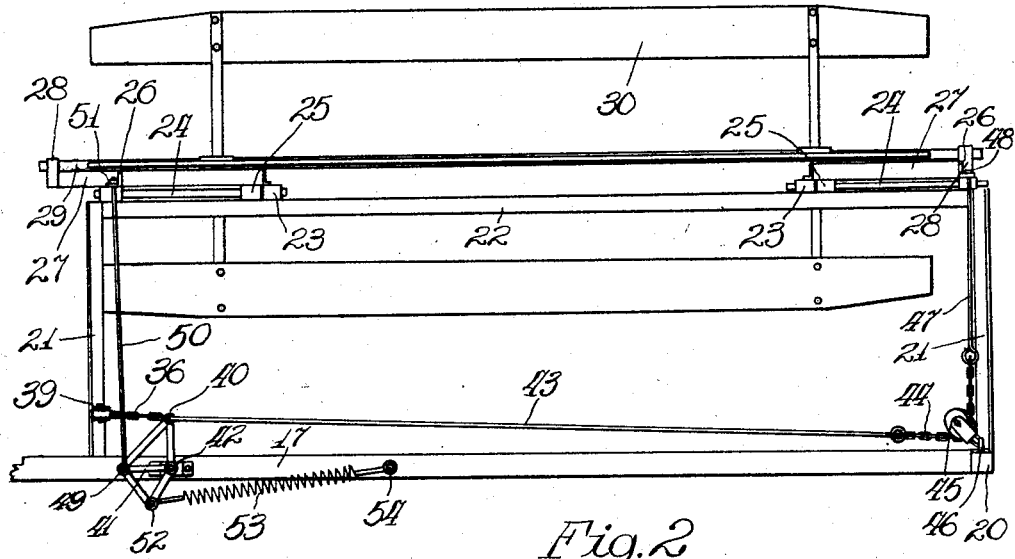
Figure 2 is a rear elevational view of the harvester part.
Figure 3:
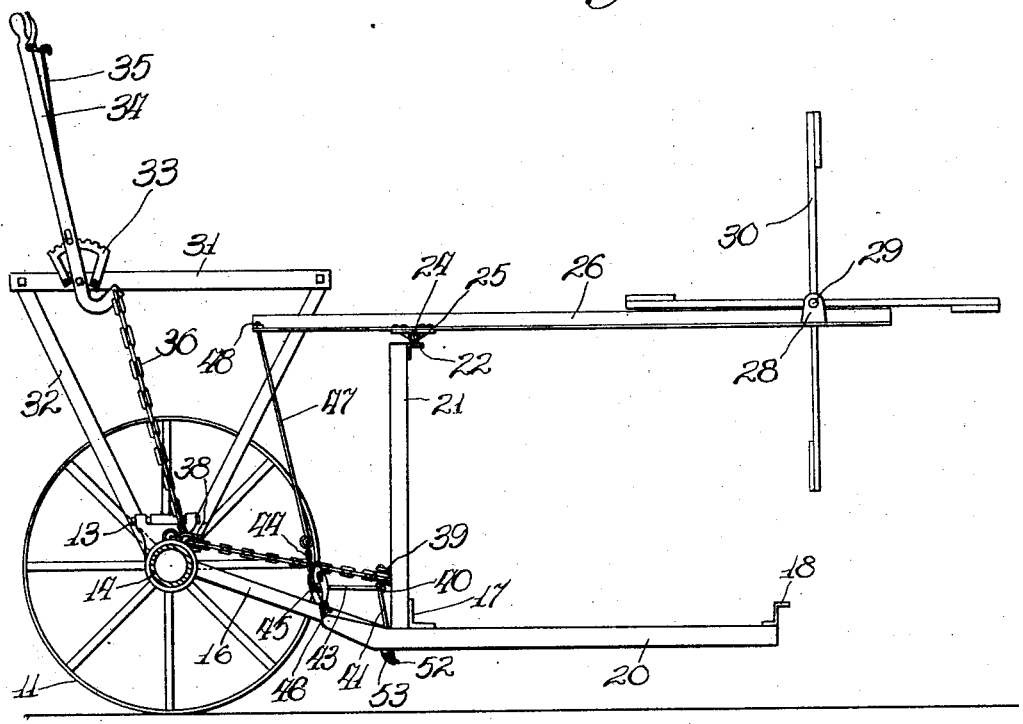
Figure 3 is a side elevational view when viewed from the grainward side of the machine.

As the harvester support 14 is floatingly or hingedly connected to the thresher part for up and down movements, on hill sides or ground slopes, it is important, obviously, that the lever which is to adjust the reel be so mounted that its position with respect to an operator's station will not change. This operator's station or deck is indicated at 31, the same being considered a part of the thresher part and disposed above the wheel 11 shown and carried on the axle part 12 by any suitable form of framework 32. The side of the platform 31 carries a detent, quadrantal rack 33 and also has fulcrumed thereon a control lever 34. This lever has the usual detent mechanism indicated at 35 for locking the lever 34 in adjusted position with respect to the notches on the quadrant 33. The lower end of the lever 34 is curved forwardly and upwardly, as shown in Figure 2, and has connected to its end, one end of a flexible element which may be in the form of a chain 36, which chain is trained around a sheave 37 appropriately mounted on the inner end of the harvester support 14, as shown. The harvester support 14 carries another sheave 38, to cause the run of the chain 36 to extend longitudinally ahead substantially across and above the inner line lever 16, as shown in Figure 1. The chain is next trained around a sheave 39 suitably secured to the inner standard 21, which sheave 39 functions to direct the chain transversely and grainwardly, as shown in Figure 1. The chain is then dead-ended to the upper point 40 of a bell crank lever 41 pivoted at 42 to the back side of the angle bar 17, as best shown in Figure 2. The point 40 of the bell crank lever 41 has connected to it a pull rod 43, which is connected to a flexible element 44 which is trained around a sheave 45 carried, as shown in Figures 2 and 3, by a hook 46 carried by the outer, longitudinal frame piece 20. The chain 44 is directed upwardly by the sheave 45 and in turn is connected to a link or rod 47 having its upper end, which is threaded, adjustably set by a nut 48 into the rear end of the outer reel support beam 26. By this means, an adjustment is provided for setting and aligning the reel relative to the cutting mechanism.

A point 49 of the bell crank lever 44 has connected to it a link 50 similarly connected in turn at 51 to the rear end of the inner reel carrying beam 26. A lower point 52 of the bell crank lever 41 has connected to it a spring 53 anchored at 54 to the angle bar 17.

In operation, the operator stands on his platform or deck 31 and, if he deems it desirable adjustably to set the reel up or down with respect to the Z-bar 18, he moves the lever 34 forward or back, as desired. If he desires to raise the reel, he must move the lever 34 in a manner to exert a pull on the flexible element 36, which in turn rocks the bell crank 41 about its pivot 42 in such a manner that the bell crank pulls down on the link 50 and similarly, through the rod 43, pulls down on the link 47. The two links 47 and 50 are so arranged that the down pull exerted by them is simultaneous and equal, whereby the two spaced beams 26 at their rear ends are rocked downwardly together about the shafts 24, the effect of which is to raise the forward ends of the beams 26 and thus move the reel 30 upwardly. The spring 53 acts as a counter-balance for the weight of the reel and exerts a pull on the bell crank lever 41, to assist the operator in raising the reel in an obvious manner and thus materially lessens the manual effort required in effecting upward adjustment of the reel. The lever 34 with its detent mechanism indicated at 35 cooperates in the usual manner with the notches in the quadrant 33 to hold the parts in any desired adjusted position. If the reel is to be lowered, the lever 34 is freed and the weight of the parts themselves transmitted from the reel causes a lowering thereof in an obvious manner.

The important feature of the invention then is that the reel adjusting lever 34 will be at all times carried in the same location on the platform 31, and this is so regardless of whether or not the platform floats up or down in accordance with land slopes. The flexible connections described are what make it possible to so locate this lever 34. Of course, obviously the particular mechanism for adjusting the reel would also be of great use in connection with the so-called stiff platforms. In the so-called hillside machines, in which the thresher body is leveled and in which the harvester platform floats, the particular arrangement herein disclosed is especially desirable because of the many relative movements taking place between the thresher and harvester parts.

From this detailed disclosure it must now be apparent that mechanism is provided which achieves the desirable objects heretofore set out for the invention.

It is the intention to cover herein all such changes and modifications which do not materially depart from the spirit and scope of the invention, which has been expressed in the following claims.

What is claimed is:

1. In a harvester thresher comprising, in combination, a longitudinally disposed thresher part, a transversely disposed harvester part including a reel, said harvester part being connected to the thresher part in offset relation thereto, a lever on the thresher part, and connections from the lever to the reel to adjust the latter.

2. In a harvester thresher comprising, in combination, a longitudinally disposed thresher part, a transversely disposed harvester part including a reel, said harvester part being flexibly connected to the thresher part in offset relation thereto, a lever on the thresher part, and flexible connections from the lever to the reel to adjust the latter.

3. In a harvester thresher comprising, in combination, a longitudinally disposed thresher part including an operator's deck, a transversely disposed harvester connected to the thresher part in offset relation thereto and including a reel, a lever fulcrumed on said deck, and connections from the lever to the reel to adjust the latter.

4. In a harvester thresher comprising, in combination, a longitudinally disposed thresher part, a transversely disposed harvester part floatingly connected to the thresher part and including a reel, said harvester part arranged in offset relation to the thresher part, a lever fulcrumed on the thresher part, and connections from the lever to the reel to adjust the latter.

5. In a harvester thresher comprising, in combination, a longitudinally disposed thresher part including an operator's deck, a transversely disposed harvester part floatingly connected to the thresher part in offset relationship and including a reel, a lever fulcrumed on the deck, and flexible connections from the lever to the reel to adjust the latter.

6. In a harvester thresher comprising, in combination, a longitudinally disposed thresher part, a transversely disposed harvester part connected in offset relation to the thresher part, beams rockingly carried by the harvester part, a reel supported on said beams, and means on the thresher part for rocking the beams to raise or lower the reel.

7. In a harvester thresher comprising, in combination, a longitudinally disposed thresher part, a transversely disposed harvester part connected in offset relation to the thresher part, a pair of longitudinally arranged beams pivotally mounted intermediate their ends on said harvester part, a reel carried by the forward ends of said beams, and means on the thresher part having connections to the rear end of said beams for rocking the same to raise or lower the reel.

8. In a harvester thresher comprising, in combination, a longitudinally disposed thresher part, a transversely disposed harvester part flexibly connected in offset relation to the thresher part, beams rockingly carried by the harvester part, a reel supported on said beams, a lever fulcrumed on the thresher part, and flexible connections between the lever and beams to rock the latter whereby to adjust said reel.

9. In a harvester thresher comprising, in combination, a longitudinally disposed thresher part, a transversely disposed harvester part flexibly connected in offset relation to the thresher part, a pair of longitudinally arranged beams pivotally mounted intermediate their ends on said harvester part, a reel carried by the forward ends of said beams, a lever fulcrumed on the thresher part, and flexible connections from the lever to the rear ends of the beams to rock the latter whereby to adjust said reel.

10. In a harvester thresher comprising, in combination, a longitudinally disposed thresher part, a transversely disposed harvester part including a reel, means flexibly connecting the harvester part to the thresher part in offset relation, a lever on the thresher part, connections from the lever to the reel to adjust the latter, and spring means exerting a force to assist raising of the reel.

11. In a harvester thresher comprising, in combination, a longitudinally disposed thresher part including an operator's deck, a transversely disposed harvester flexibly connected in offset relation to the thresher part and including a reel, a control means on said deck, and connections from said control means to the reel to adjust the latter, said connections including spring means to exert a force to assist raising of the reel.

12. A harvester thresher comprising, in combination, a thresher part, a harvester part connected to the thresher part, a pair of spaced beams rockingly carried on the harvester part, a reel carried on said beams, a lever, a bell crank, connections between the lever and bell crank, and connections from the bell crank to rock said beams.

13. A harvester thresher comprising, in combination, a thresher part, a harvester part connected to the thresher part, a pair of spaced beams rockingly carried on the harvester part, a reel carried on said beams, a lever, a bell crank, connections between the lever and bell crank, connections from the bell crank to each beam to rock the same together, and a spring acting on the bell crank to assist movement of the beams.

14. A harvester thresher comprising, in combination, a thresher part, a harvester part floatingly connected to the thresher part, a pair of spaced beams rockingly carried on the harvester part, a reel mounted on said beams, a lever fulcrumed on the thresher part, a member pivotally mounted on the harvester part, flexible connections between the lever and pivoted member, and flexible connections from said pivoted member to the beams whereby when the lever is actuated said beams will be moved together to adjust the reel.

15. A harvester thresher comprising, in combination, a thresher part, a harvester part floatingly connected to the thresher part, a pair of spaced beams rockingly carried on the harvester part, a reel mounted on said beams, a lever fulcrumed on the thresher part, a member pivotally mounted on the harvester part, flexible connections between the lever and pivoted member, flexible connections from said pivoted member to the beams whereby when the lever is actuated said beams will be moved together to adjust the reel, and spring means acting on said pivoted member to counter-balance the weight of the reel.

In testimony whereof we affix our signatures.

EDWARD A. JOHNSTON.
MELVILLE J. MITCHELL.